United States Patent
de Kock et al.

(10) Patent No.: US 9,150,068 B2
(45) Date of Patent: Oct. 6, 2015

(54) TRAILER COUPLING

(71) Applicant: WESTFALIA-Automotive GmbH, Rheda-Wiedenbruck (DE)

(72) Inventors: Lambert Hendrik de Kock, Takapuna Auckland (NZ); Stuart James Terrell, Mt Roskill Auckland (NZ)

(73) Assignee: WESTFALIA-AUTOMOTIVE GMBH, Rheda-Wiedenbruck (DE)

( * ) Notice: Subject to any disclaimer, the term of this patent is extended or adjusted under 35 U.S.C. 154(b) by 0 days.

(21) Appl. No.: 14/134,466

(22) Filed: Dec. 19, 2013

(65) Prior Publication Data

US 2014/0103618 A1 Apr. 17, 2014

Related U.S. Application Data (63) Continuation of application No. 13/981,253, filed as application No. PCT/EP2012/000275 on Jan. 23, 2012, now abandoned.

(30) Foreign Application Priority Data

Jan. 24, 2011 (DE) .................... 10 2011 009 306

(51) Int. Cl.
*B60D 1/54* (2006.01)
*B60D 1/52* (2006.01)

(52) U.S. Cl.
CPC ... *B60D 1/52* (2013.01); *B60D 1/54* (2013.01)

(58) Field of Classification Search
CPC .............. B60D 1/52; B60D 1/54; B60D 1/07
See application file for complete search history.

(56) References Cited

U.S. PATENT DOCUMENTS

| | | | | |
|---|---|---|---|---|
| 6,595,540 B1 * | 7/2003 | MacKarvich | ............... | 280/491.3 |
| 7,837,216 B1 * | 11/2010 | Greaves et al. | ............ | 280/491.4 |
| 8,371,603 B2 * | 2/2013 | Columbia | ..................... | 280/511 |
| 2005/0274761 A1 | 12/2005 | Hesmer | | |
| 2009/0302078 A1 | 12/2009 | Wang | | |
| 2010/0084449 A1 * | 4/2010 | Columbia | ..................... | 224/520 |
| 2010/0230455 A1 | 9/2010 | Wang | | |
| 2010/0270774 A1 * | 10/2010 | Boberg et al. | .............. | 280/479.3 |
| 2012/0217724 A1 * | 8/2012 | Works | ........................ | 280/490.1 |

FOREIGN PATENT DOCUMENTS

| | | |
|---|---|---|
| DE | 9006077.6 | 9/1990 |
| DE | 4214823 | 11/1993 |
| DE | 19733313 | 2/1999 |
| DE | 202006012096 | 12/2006 |
| EP | 1987968 | 11/2008 |
| EP | 1987968 A1 * | 11/2008 ............... B60D 1/54 |
| FR | 2348073 | 11/1977 |
| FR | 2711098 | 4/1995 |
| GB | 2108450 | 5/1983 |

\* cited by examiner

*Primary Examiner* — Kevin Hurley
*Assistant Examiner* — Gabriela C Craciun
(74) *Attorney, Agent, or Firm* — Hoffmann & Baron, LLP (57) ABSTRACT

A trailer coupling for a motor vehicle includes a base holder which can be or is securely mounted on the vehicle and further includes a coupling arm at the free end of which a coupling element is arranged for coupling a trailer and which protrudes towards the rear from the motor vehicle in a position of use, wherein the coupling arm can be releasably secured to the base holder or is mounted movably between the position of use and a position of non-use in which it is moved towards the motor vehicle. In the trailer coupling, it is provided that, for connection to the base holder, the coupling arm includes a holder part which can be secured to the base holder by means of a base holder fixing device and a coupling part on which the coupling element is located.

21 Claims, 5 Drawing Sheets

TRAILER COUPLING

This application is a continuation application of U.S. patent application Ser. No. 13/981,253, filed Jul. 23, 2013, which claims priority based on an International Application filed under the Patent Cooperation Treaty, PCT/EP2012/000275, filed Jan. 23, 2012, which claims priority to DE102011009306.0, filed Jan. 24, 2011.

BACKGROUND OF THE INVENTION

The invention relates to a trailer coupling for a motor vehicle, in particular a passenger car, comprising a base holder which can be or is securely mounted on the vehicle and further comprising a coupling arm at the free end of which a coupling element is arranged for coupling a trailer and which protrudes towards the rear from the motor vehicle in a position of use, wherein the coupling arm can be releasably secured to the base holder or is mounted movably between the position of use and a position of non-use in which it is moved towards the motor vehicle.

A trailer coupling for a motor vehicle for example comprises a fixed coupling arm to the free end of which a coupling element, for example a hitch ball, is attached. Apart from commonly found designs, in which the coupling arm is fixed, so-called detachable coupling arms which can be removed from the base holder if not in use, or coupling arms which are, for example, pivotably mounted on the base holder, so that they can be moved from a position of use, in which they protrude at the rear beyond a bumper of the motor vehicle, into a position of non-use, covered by the bumper, are commonly used as well.

Although such trailer couplings may be satisfactory for a multitude of applications, for example if a trailer is usually to be towed and rotatably mounted on the coupling element using a so-called tow ball coupling, difficulties are experienced if a load carrier is to be mounted on the spherical coupling element instead of a trailer. Load carriers can only be secured safely to the spherical coupling element by means of a complex clamping mechanism. Security against rotation nevertheless poses problems.

In addition, manufacturing costs for typical trailer couplings are relatively high, because each vehicle type as a rule requires an individual coupling arm which matches the geometrical design of the rear end of the motor vehicle. The base holder is generally mounted on a crossmember located behind the rear bumper, and the coupling arm has to extend backwards beyond the motor vehicle from the base holder on the rear bumper.

SUMMARY OF THE INVENTION

The present invention is therefore based on the problem of providing an optimised trailer coupling which can expediently be produced in a cost-effective manner.

To solve this problem in a trailer coupling of the type referred to above, it is provided that, for connection to the base holder, the coupling arm comprises a holder part which can be secured to the base holder by means of a base holder fixing device and a coupling part on which the coupling element is located, wherein the holder part and the coupling part can be releasably connected to one another by means of a connecting device serving as an arm connecting device, which comprises a first connecting body and a second connecting body which can be releasably connected to the first connecting body.

One aspect of the invention is that the coupling arm is a multi-part component, i.e. it has a holder part which can be secured to the base holder and a coupling part on which the coupling element is in turn located. Each component of the coupling arm therefore has its own function. The holder part can be adapted optimally to the base holder. The coupling part, on the other hand, can have an individual geometry, a coupling element matching the respective application and the like. If adaptation to other requirements is necessary, for example if a different coupling element is required, only the coupling part has to be replaced.

Manufacturing complexities and costs are reduced considerably, because the basis configuration of base holder and holder part, for example, can be produced identically for many vehicle types and the coupling can be matched to the respective vehicle type by means of the individual coupling part. It is obviously also possible to use similar coupling parts for different vehicle types and individual base holders and/or holder parts.

The coupling arm, which is movably mounted for example, is advantageously located behind a bumper of the motor vehicle in the position of non-use. It is in any case advantageous if the coupling arm is substantially invisible in the position of non-use.

The trailer coupling according to the invention is therefore extremely flexible in terms of assembly and application.

At the same time, a base is provided for an expedient further development of the invention, in which the trailer coupling comprises a load carrier adapter part which, for connection to the holder part, comprises a connecting body matching the connecting body of the holder part and which is or can be connected to a load carrier having a carrying area for carrying a load. The coupling part can therefore be replaced by a load carrier adapter part for optimum connection to a load carrier.

The load carrier adapter part can form a component part of a load carrier, i.e. the load carrier can be quasi-directly coupled to the holder part by means of the load carrier adapter part permanently joined thereto.

At this point, it should be noted that a connecting body matching the holder part can be provided directly on a load carrier, so that the load carrier can be secured directly to the holder part or to the arm connecting device respectively.

The holder part and/or the load carrier adapter part and/or the coupling part expediently has/have an arm- or rod-like shape. The holder part and/or the load carrier adapter part and/or the coupling part can be curved as a whole or in sections and/or have straight sections or may even be straight throughout.

If the holder part and/or the load carrier adapter part has/have a rod-like, bar-shaped or arm-like shape (or a combination thereof), this has the advantage that an arm provided for supporting the load carrier for example protrudes at the rear below a rear bumper of the motor vehicle, so that the connecting body of the load carrier connecting device, which is mounted on the arm, is easily accessible, and the load carrier can be mounted with ease.

Although the load carrier and the load carrier adapter part can be permanently connected to one another, they are expediently detachable from one another. It is then advantageous if the load carrier adapter part and the load carrier are provided with a load carrier connecting device for releasable connection.

The load carrier connecting device and the arm connecting device can in an expedient variant have an identical and/or similar structure and/or have mutually compatible components and/or mutually match one another. But even if the structures of the components differ somewhat, i.e. they have non-matching components, the measures explained below are expedient.

For example, the arm connecting device and the load carrier connecting device have matching first and second connecting bodies. Further connecting bodies can obviously be provided as well. In this context, the term "connecting body" is not restricted to a one-piece connecting body, but also includes multi-part connecting bodies.

To simplify the description, only one connecting device is described in the description below; this may be the arm connecting device or the load carrier connecting device or both.

The connecting device is expediently releasable and/or closable without the use of tools. The operator can therefore open or close the connecting device without using an additional tool, such as a screwdriver. Operation by means of a tool may alternatively be desirable, for example to enhance theft protection or tamper proofing.

It is also possible for the connecting device to comprise one or more screws.

The first connecting body has a mounting flange for example. The second connecting body may also have a mounting flange. The two mounting flanges can expediently be laid against one another. To secure and/or connect the two mounting flanges, one or more screws and/or a clamping mechanism are for example suitable.

The first connecting body and the second connecting body expediently have at least one positive-locking projection and at least one positive-locking receptacle for a positive connection between the two connecting bodies. The positive-locking receptacle may for example be a groove, while the positive-locking projection may be a projection fitting into the groove.

One connecting body is preferably held positively on the other connecting body, for which purpose the connecting bodies are provided with matching positive-locking contours. It is expedient if opposite sides of one connecting body are provided with positive-locking projections which can engage with positive-locking receptacles provided on opposite sides of the other connecting body. It is obviously also possible to provide on one side or both sides of the latter connecting body at least one positive-locking projection each, which would then require a positive-locking receptacle on the relevant side of the former connecting body.

The positive-locking projection and the positive-locking receptacle expediently have dovetail contours. These provide a particularly simple and secure mutual hold of the two connecting elements.

The connecting device can, however, also be designed at least partially as a bayonet connection. Bayonet connecting means may for example be provided on the first connecting body and on the second connecting body. The two connecting bodies are therefore assembled in a rotary assembly process.

The connecting device is expediently lockable. It advantageously comprises a locking element for locking the connection between the first connecting body and the second connecting body. The locking element is captively but movably mounted on the first connecting body or the second connecting body for moving between a locking position and an unlocking position. The locking element is therefore available whenever required. In the locking position, the locking element engages with a locking receptacle on the respective other connecting body.

The locking element is expediently lockable in the unlocking position and/or the locking position, so that it can only be displaced from its adopted position if a preset, relatively high, force is applied.

An advantageous variant provides that the locking element is spring-loaded towards the locking position. The locking element therefore automatically adopts its locking position unless it is moved out of it by force, for example by the operator. The spring arrangement required for this purpose for example comprises an arm spring, a coil spring or the like.

The connecting device expediently comprises a clamping element or a clamping body by means of which the first connecting body can be clamped to the second connecting body.

The clamping element or clamping body and/or the locking element can expediently be operated without the use of tools, in particular manually. The clamping element (or the clamping body) or the locking element may have an operating handle for this purpose.

A motor drive, e.g. an electric motor, is advantageously provided for moving the holder part between the position of use and the position of non-use towards the vehicle, but manual operation is also possible.

The following explanations relate to the connection between the holder part and the base holder; this may be releasable, involve a pivotable connection or the like.

The measures advantageously provided in the base holder fixing device as explained below can of course be used to advantage in the arm connecting device or the load carrier connecting device described above as well.

The base holder fixing device expediently comprises at least one pair of positive-locking surfaces which can be moved between a release position, in which the positive-locking surfaces are remote from one another, and a fixing position of the fixing device, in which the positive-locking surfaces are in positive contact with one another. The holder part can therefore be positively secured to the base holder.

In this context, either both or only one of the positive-locking surfaces can be movable. The movable positive-locking surface may for example be provided on a bolt, a ball or a roll or another moulded part or positive-locking element. The at least one movable positive-locking surface is preferably provided on a positive-locking body which is movably mounted on or in the holder part.

The base holder fixing device preferably comprises a movably mounted operating body or displacer body, for example a bolt or another operating or displacer part, for operating or displacing a positive-locking body into a positive-locking receptacle. Positive-locking surfaces are provided both on the positive-locking body and on the positive-locking receptacle. The positive-locking body may for example comprise a ball, a roller or another moulded part. The positive-locking receptacle may for example comprise a groove, in particular an annular groove, a calotte or the like.

The operating body or the displacer body and/or at least one positive-locking body is/are expediently movably mounted on or in the holder part. In this way, it is for example possible to install an operating or displacer body movably in the interior of the holder part in order to act in turn on one or more positive-locking bodies for a positive hold on the base holder. It is advantageous if the at least one positive-locking body is likewise movably mounted on or in the holder part. There may for example be provided passages (or at least one passage) branching off a bearing receptacle for the operating body or the displacer body, in which passage(s) a respective positive-locking body which is operated or displaced by the operating body or the displacer body is movably mounted.

A releasable connection between the holder part and the base holder expediently is a plug-in connection. The base holder may for example have a socket into which a plug projection of the holder part can be inserted. It is obviously also possible for the holder part to have a socket which can be pushed onto a corresponding plug projection on the base holder.

A movable connection between the holder part and the base holder can for example be established by providing that the holder part and the base holder comprise bearing components of a pivot bearing and/or a sliding bearing, so that the holder part is pivotably and/or slidably mounted on the base holder. As a result, the holder part can for example be moved from a position of non-use behind a bumper of the motor vehicle towards a position of use, in which the holder part itself and possibly the coupling part or the load carrier adapter part project towards the rear beyond the bumper, so that a trailer can be coupled or a load carrier can be mounted.

An anti-rotation device is advantageously provided between the holder part and the base holder. For this purpose, the holder part and the base holder are provided with fixed anti-rotation positive-locking contours, for example triangular contours such as a triangular projection and a triangular receptacle, and/or balls and calottes for mutual engagement. These anti-rotation positive-locking contours may for example be present in the "plug-in variant" described above, but obviously also in a pivotable and/or slidable mounting of the holder part on the base holder.

DETAILED DESCRIPTION OF THE PREFERRED EMBODIMENTS

In the description of the embodiments of systems 10a-10e, identical or similar components are identified by the same reference numbers. In order to highlight differences, the letters a, b, c, d and e are in some cases added to the reference numbers.

The systems 10a-10e comprise base holders 11a-11e to which holder parts 12a-12e can be releasably secured (holder parts 12a-12d) or on which holder parts (holder part 12e) are movably mounted.

Further components can be secured to the holder parts 12a-12e, for example coupling parts 13a, 13b, 13c or 13e. The holder part 12d could also be provided with a coupling part, which is however not shown in the drawing. On each of the coupling parts 13, a coupling element 14 is provided, for example a hitch ball. A trailer T can be attached to the hitch ball by means of a so-called tow ball coupling.

Each of the systems 10a-10e therefore forms a trailer coupling 9a, 9b, 9c, 9e for coupling a trailer if the coupling parts 13a, 13b, 13c or 13e are placed on the holder parts 12a-12e, thereby forming coupling arms.

However, a load carrier, for example for transporting bicycles, a transport box or the like, can also be secured easily and efficiently in systems 10a-10e by connecting the respective load carrier (load carriers 16a, 16b and 16d are shown by way of example) to the respective holder part—in the case of holder parts 12a, 12d directly to the holder part and in the case of holder parts 12b, 12c and 12e by means of a load carrier adapter part 15b, 15c and 15e.

The connection between the holder part and the load carrier, possibly with the interposition of the load carrier adapter part 15b, 15c and 15e, is user-friendly, i.e. easily released and made, while being capable of bearing high loads, being in particular secured against rotation. The quality of the connection between the vehicle and the load carrier is optimal, so that the load carrier can be loaded heavily. This makes for very safe driving.

Figure 1:
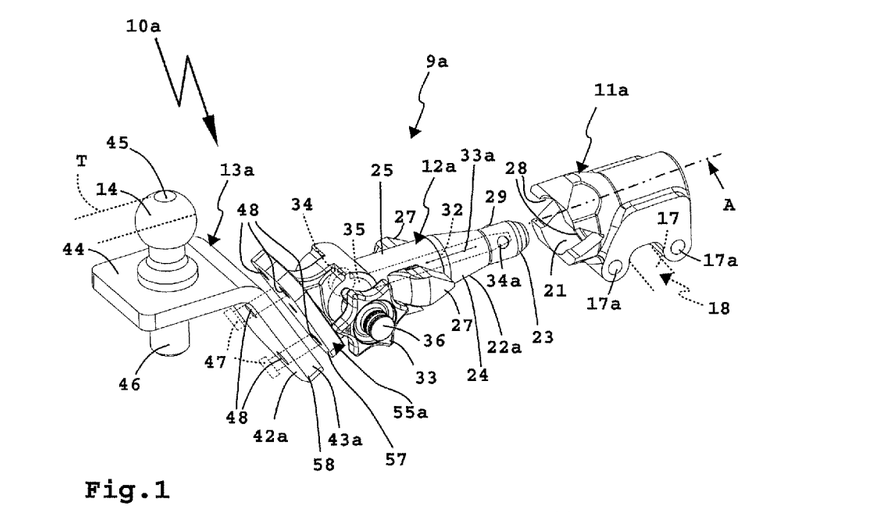
FIG. 1 is an oblique perspective view of a trailer coupling with a coupling part which can be or is mounted on a holder part by means of mounting flanges and which comprises a hitch ball.
Figure 2:
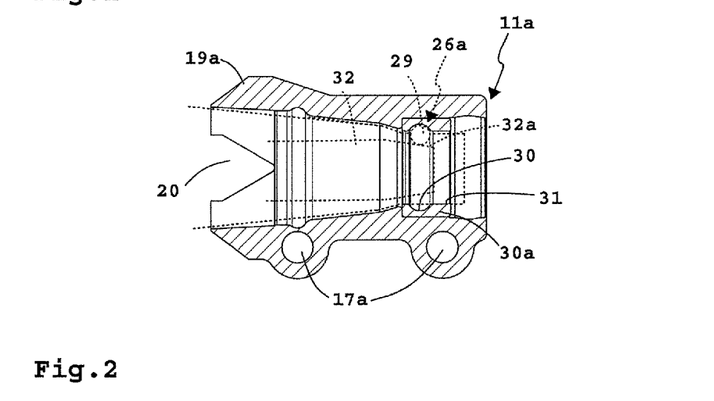
FIG. 2 is a cross-sectional view of a base holder of the trailer coupling from FIG. 1 along a line A.

The base holder 11a can be or is secured, for example welded, bolted or bonded, to a crossmember 17 of a vehicle 18 indicated diagrammatically. The base holder 11a has mounting holes 17a for example. In principle, a base holder of a system according to the invention could be an integral part of a crossmember. The base holder 11a comprises a reception sleeve 19a with a plug-in receptacle 20 for inserting and holding the holder part 12a. The plug-in receptacle 20 has a relatively wide insertion opening 21 and tapers towards its end region 31. The base holder 11a consists of a metal for example, in particular steel or aluminum.

The holder part 12a has a plug-in projection 22a for insertion into the plug-in receptacle 20. Matching the plug-in receptacle 20, the plug-in projection 22a has a front region 23 with a smaller diameter, which is adjoined by a conical region 24 and then by a neck region 25. The diameter of the neck region 25 matches that of the insertion opening 21.

A base holder fixing device 26a comprises anti-rotation positive-locking contours 27 extending laterally from the neck region 25 for engagement with anti-rotation positive-locking contours 28 provided on the base holder 11a, in particular on its insertion opening 21. The anti-rotation positive-locking contours 27, 28 may for example be triangular or wedge-shaped and positively engage with one another when the plug-in projection 22a is inserted into the plug-in receptacle 20, so that the holder part 12a is non-rotatably held on the base holder 11a.

For a secure location and clamping of the holder part 12a on the base holder 11a, positive-locking bodies 29 are provided which engage with one or more positive-locking receptacles 30 of the base holder fixing device 26a in a fixing position. The positive-locking bodies 29 may for example be balls in the known manner, which can be moved by means of an operating body 32 on the front outer circumference of the plug-in projection 22a for engagement with the positive-locking receptacle(s) 30. The positive-locking receptacle 30 is annular for example, in particular an annular groove, but at least one calotte or another positive-locking receptacle can be used as well. This annular groove is located in the end region of the plug-in receptacle 20. As the drawing indicates, an annular element 30a on which the annular groove is provided can for example be provided in the plug-in receptacle 20 for this purpose.

The operating body 32, which can also be described as a displacer body, has a rod-like or bolt-like shape for example. In its front region facing the positive-locking bodies 29, the operating body 32 has inclined surfaces 32a, so that it displaces the positive-locking bodies 29 radially outwards towards the front outer circumference of the plug-in projection 22a if it is displaced towards the positive-locking bodies 29, in particular along a linear path. In this direction (arrow 33a), the operating body 32 is advantageously spring-loaded, so that the base holder fixing device 26a locks and fixed automatically in a manner of speaking.

The operating body 32 can be operated by means of a handle 33. To the handle 33, a pinion 34 meshing with a toothed section 35 of the operating body 32 is motion-coupled or permanently connected. An operator can therefore grasp and turn the handle 33 and thereby move the operating body 32 away from the positive-locking bodies 29 (in the drawing towards the left), so that the latter can return in guide channels 34a radially inwards into an interior of the plug-in projection 22a for disengagement from the positive-locking receptacle 30. In this way, the base holder fixing device 26a is unlocked.

The base holder fixing device 26a is advantageously lockable by means of a lock 36.

The above explanations indicate clearly that some constructive effort is required in locking the holder part 12a on the base holder 11a. In particular, a base body 37a of the holder part 12a is designed for receiving the base holder fixing device 26a and has to be capable of bearing mechanical loads for driving with a trailer.

In terms of manufacturing technology, it is advantageous if the base holder 11a and the holder part 12a can be used as described above for different vehicle types, and if a load carrier can be adapted easily and comfortably if required. That this is the case will become clear from the following explanations.

The base body 37 of the holder part 12a, which is a single part in the illustrated embodiment, comprises a base holder region 38 for mounting on the base holder 11a, a middle section 39 and a mounting section 40 for connection to further components, such as the coupling part 13a.

The mounting section 40 is provided with a mounting flange 41a for connection to the coupling part 13a. The mounting flange 41a may for example be plate-shaped. The mounting flange 41a is inclined relative to a longitudinal axis of the holder part 12a, for example at a downward angle, which is optional, however. Possible alternatives would be a mounting flange perpendicular to the longitudinal axis or inclined upwards.

The coupling part 13a comprises a base body 42a with a mounting plate 43a provided for mounting on the mounting flange 41a. The mounting plate 43a projects at an angle from a supporting plate 44 on which the coupling element 14 is in turn located. The coupling element 14 comprises a hitch ball 45 mounted on an for example rod-shaped support 46. The support 46 may for example be welded or bonded or the like to the base body 44a; in the illustrated embodiment, however, it is passed through an opening of the supporting plate 44 and bolted from below. This simplifies the replacement of the coupling element 14 by another coupling element, which may for example have a different geometry. The support 46 is supported on top of the supporting plate 44 by way of a flanged projection. The hitch ball 45 projects upwards from the supporting plate 44, enabling a trailer to be coupled.

The mounting plate 43a is bolted to the mounting flange 41a. Four bolts 47 are for example passed through or tightened into bores 48 in the mounting plate 43a and the mounting flange 41a respectively.

In the illustrated embodiment, the mounting plate 43a and the supporting plate 44 form a single piece, i.e. they can be produced by simple means, for example by edging or forming a plate-shaped blank. Multi-part coupling parts and/or multi-part base bodies of coupling parts can obviously be used as well.

Figure 3:
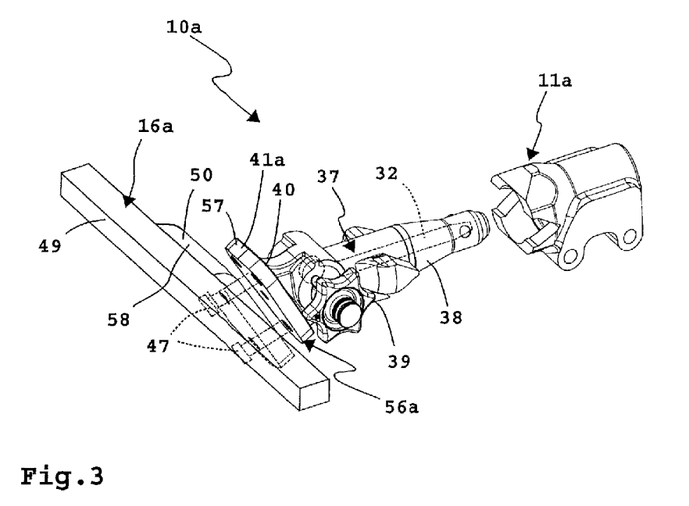
FIG. 3 shows the trailer coupling according to FIG. 1, but with a diagrammatically indicated load carrier instead of the coupling part.

The joining technology already used in the case of the holder part 12a can also be used for a load carrier. It is for example possible to secure the load carrier 16a to the holder part 12a instead of the coupling part 13a. Of the load carrier 16a, the drawing only shows a crossmember 49 and a mounting plate 50 projecting at an angle therefrom like the mounting plate 43a. The load carrier 16a advantageously comprises further components, for example those of the load carrier 16b shown in FIG. 4a.

Figure 4A:
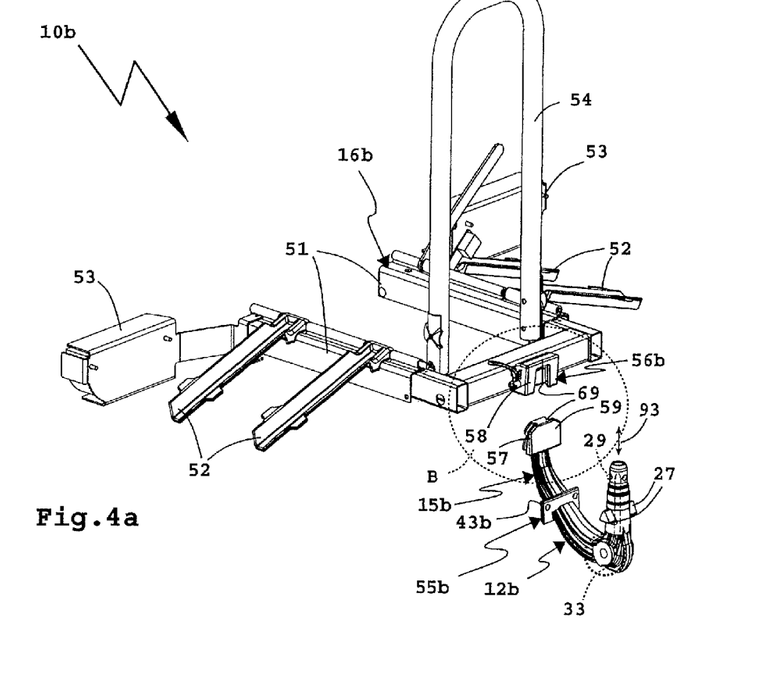
FIG. 4a shows a load carrier system with a load carrier and a load carrier connecting device for a non-rotatable connection of the load carrier to a load carrier adapter part mounted on a holder part.

The load carrier 16b (or the load carrier 16a) for example has a crossmember 49 from which project longitudinal members 51 at an angle, for example in a U-shape. This forms a carrier base. Pivotably mounted on the longitudinal members 51 are carrying elements 52, for example grooves for transporting bicycles, which are movable between a position of use (shown in the drawing), in which they project outwards from the longitudinal members 51, and a position of non-use, in which they are moved inwards between the longitudinal members 51. A transport box or the like can of course also be placed on the longitudinal members 51. Lamps 53 are further mounted on the load carrier 16b, for example in the free end region of the longitudinal members 51. In addition, the load carrier 16b has a support 54, for example a U-shaped bow, to which the load placed on the load carrier 16b can be secured.

The mounting plate 50 is for example attached to the crossmember 49 by welding, bolting or other means. A simple bolting technology is provided for mounting on the holder part 12a as well. The mounting plate 50 likewise has bores 48 for securing to the mounting flange 41a with the bolts 47.

The mounting flange 41a, the mounting plate 43a and the bolts 47 form an arm connecting device 55a. The mounting flange 41a, the mounting plate 50 and the bolts 47 form a load carrier connecting device 56a. The mounting flange 41a forms a first connecting body 57, while the mounting plate 43a or the mounting plate 50 forms a second connecting body 58 of the arm connecting device 55a or the load carrier connecting device 56a.

While the mounting of the load carrier 16a on the holder part 12a by means of the bolts 47 of the load carrier connecting device 56a is relatively complicated, the load carrier 16b can be secured quickly and easily to the load carrier adapter part 15b and released therefrom by means of a load carrier connecting device 56b, which represents a quick-release coupling in a manner of speaking. In this context, it should however be noted that mounting the load carrier 16a fitted with the holder part 12a on the base holder 11a is a simple process, because the holder part 12a only has to be inserted into the plug-in receptacle 20. This is particularly advantageous if the load carrier 16a is voluminous and/or heavy.

The load carrier connecting device 56b described below, however, is designed as a kind of quick-release coupling and can therefore be operated particularly easily.

Figure 5A:
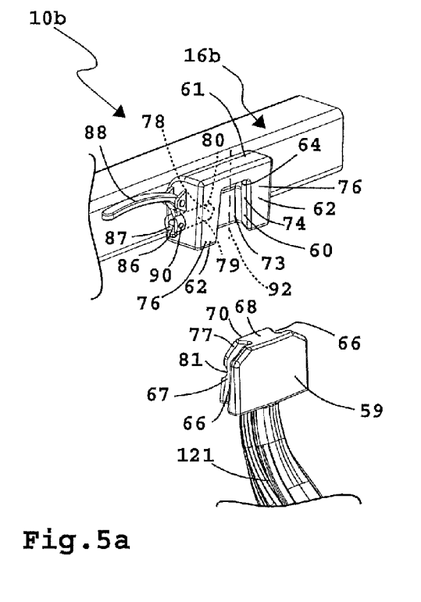
FIG. 5a shows a section from FIG. 4a, with the load carrier connecting device released.

The first connecting body 57 of the load carrier connecting device 56b comprises a plug-in head 59 which can be inserted into a plug-in receptacle 60 of a receiving body 61 forming the second connecting body 58 of the load carrier connecting device 56b. The receiving body 61 is mounted on the crossmember 49, for example by welding or the like.

The plug-in receptacle 60 is basically U-shaped. The plug-in receptacle 60 is laterally bounded by side sections 62 and at the top by a support section 63. A base wall 64 of the support section 63, which faces the plug-in receptacle 60, is supported on a front supporting surface 68 of the plug-in head 59, providing a horizontal support for the load carrier 16b.

But even about a vertical axis, there is optimum support and an optimum positive hold between the load carrier 16b and the load carrier adapter part 15b. It would already be enough to provide for example plane surfaces or other anti-rotation contours on the side sections 62. In the illustrated embodiment, however, positive-locking projections 65 are provided on the side sections 62 for positive engagement with positive-locking receptacles 66 in the plug-in head 59. The positive-locking projections 65 face one another, being oriented towards the inside of the plug-in receptacle 60. The positive-locking receptacles 66 are located on sides of the plug-in head 59 which are remote from one another, i.e. lateral flanks 67. The positive-locking receptacles 66 may for example be V-shaped, but are expediently rounded.

The positive-locking receptacles 66 expediently extend towards one another in the direction of the upper supporting surface 68, being inclined. This is of course matched by the orientation of the positive-locking projections 65, which extend towards one another in the direction of the base wall 64. This provides a particularly secure, positive location of the plug-in head 59 in the plug-in receptacle 60.

Figure 6:
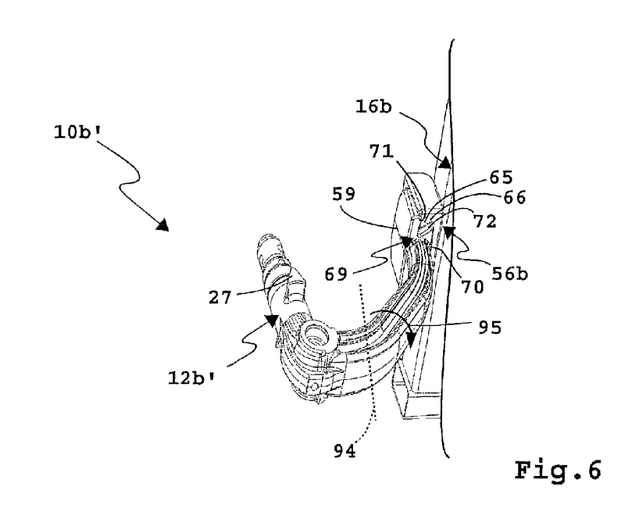
FIG. 6 is an oblique view of the load carrier connecting device from FIG. 5b from below, but with an alternative design of a holder part integrated with a load carrier adapter part.

The further design of the positive-locking surface arrangement 69 comprising the positive-locking projections 65 and the positive-locking receptacles 66, which can be seen particularly well in FIG. 6, also contributes to the optimal support of the two connecting bodies 57, 58 of the load carrier connecting device 56b, in particular preventing a relative rotation about a vertical axis or an at least approximately vertical axis H.

The plug-in head 59 comprises a substantially flat end face 70 and two supporting surfaces 71 which are offset relative thereto. The end face 70 and the two supporting surfaces 71 may for example have a parallel offset and/or extend substantially parallel to one another. The two supporting surfaces 71 laterally project beyond the end face 70. The supporting surfaces 71 are parts of the positive-locking receptacles 66, i.e. one of their lateral flanks, in relation to which the other lateral flank 72 extends at an angle. The overall result is a dovetail shape.

The positive-locking surfaces of the plug-in receptacle 60 correspond to the surfaces described above. The end face 70 is supported on a rear wall surface 73 extending between the side sections 62. The lateral flank 72 is supported on a side surface 74 of the positive-locking projections 65 adjacent to the rear wall surface 73.

The two side surfaces 74 extend from the rear wall surface 73 towards one another. An end face opening 75 of the plug-in receptacle 60 is in any case narrower than the rear wall surface 73.

The supporting surfaces 71 can be supported on supporting surfaces adjacent to the end face opening 75.

The plug-in head 59 is therefore not only supported on the second connecting body 58 or the plug-in receptacle 60 by its end face 70, but also by its rear supporting surfaces 71 in a stepped arrangement.

The insertion of the plug-in head 59 into the plug-in receptacle 60 is expediently facilitated by inclined surfaces, for example by the inclined orientation of the positive-locking projections 65 and the positive-locking receptacles 66 towards the base of the plug-in receptacle 60, but also by inclined surfaces 77 on the top of the plug-in head 59, for example adjacent to the supporting surface 68.

Figure 5B:
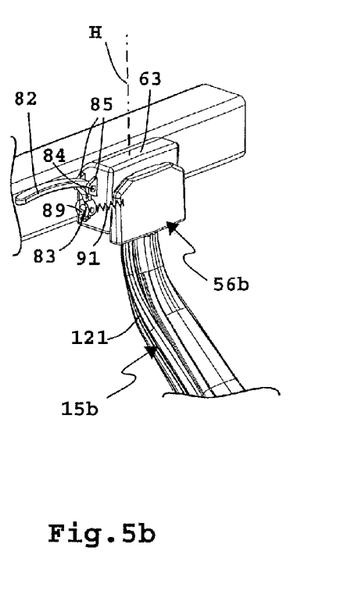
FIG. 5b shows the section from FIG. 5a, but with the load carrier connecting device closed.

The load carrier connecting device 56b comprises a locking device for locking the connection between the connecting bodies 57, 58. A locking element 78 is movably mounted on the second connecting body 58. For example, a bolt 79 may be installed for linear movement in a guide 80, for example a bore, on one of the side sections 62. In its locking position, the locking element 78 engages with a locking receptacle 81 on the plug-in head 59.

The locking receptacle 81, like the guide 80, extends perpendicular to an insertion axis 92 along which the plug-in head 59 and the plug-in receptacle 60 are connected to or disconnected from one another. If a front free end region of the bolt 79 or the locking element 78 now engages with the locking receptacle 81, the second connecting body 58 can no longer be separated from the first connecting body 57, being locked.

The locking receptacle 81 is for example designed as a groove or recess in the end face 70, but a bore or a blind hole is also conceivable. The locking receptacles 81 and the locking element 78 are expediently rounded or round, at least in the region of their surfaces which face one another and act together.

To operate the locking element 78, an operating lever 82 is provided which is pivotably mounted on the second connecting body 58 or the receiving body 61 by means of a bearing 63. From the operating lever 82 project bearing projections 84 which are pivotably mounted in bearing blocks 85. A bearing shaft could obviously pass through the operating lever 82 as an alternative. In addition to the bearing 83, an operating arm 88 and a driver arm 86 engaging with a driver receptacle 87 on the locking element 78 project from the operating lever 82. The operating arm 88 and the driver arm 86 extend at an angle—in the illustrated embodiment approximately perpendicular—relative to one another. The operating arm 88 can be gripped by the operator and swivelled; in the illustrated embodiment, the release or unlocking movement involves an upward swivelling of the operating arm 88. The driver arm 86 engaging with the driver receptacle 87 then pulls the bolt 79 or the locking element 78 out of the locking projection 81, thereby unlocking the locking device. The driver receptacle 87 may for example comprise a slot 89 with which the driver arm 86 engages in the manner of a hook while being supported on a bolt 90 extending at right angles to the slot 89.

The locking element 78 is expediently spring-loaded towards the locking position. For example, an arm spring may be provided to load the operating lever 82 in the direction of the locking position. It is however also possible for a tension spring 91 to load the locking element 78 directly. The tension spring 91 is expediently protected in the interior of the reception body 61, which is only indicated diagrammatically in the drawing.

The locking element 78 can obviously act as a clamping element as well, for example if its front free end has an inclined surface which acts on the mating contour—in the illustrated embodiment the locking receptacle 81—by wedging or clamping. The locking receptacle 81 could also have an inclined or clamping surface, in which case it is unnecessary but expedient if the associated locking or clamping element likewise has an inclined surface.

From the above explanations, it becomes clear that the load carrier connecting device 56*a* can be unlocked easily by operating the operating lever 82 (by raising the operating arm 88), followed by an easy release by lifting the load carrier 16*b* off the plug-in head 59. The mounting of the load carrier 16*b* is likewise simple. Its reception body 61 is pushed onto the plug-in head 59, wherein it is expediently provided that the locking element 78 is moved towards the unlocking position in the fitting process, for example by having its free end slide along one of the inclined surfaces 77. An active unlocking in the fitting process would however also be possible; in this case, an operator would operate the operating arm 88, for example by pulling it up.

Figure 4B:
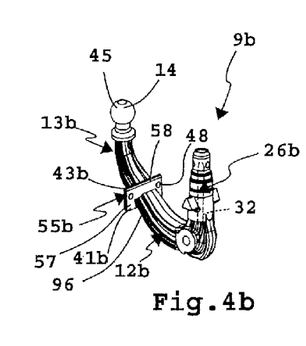
FIG. 4b shows the holder part from FIG. 4a, but in combination with a coupling part having a spherical head.
Figure 4C:
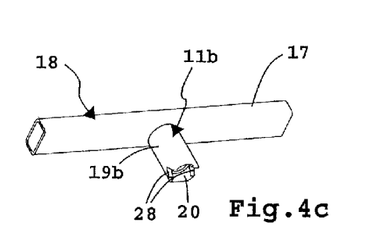
FIG. 4c shows a crossmember with a base holder for the holder part from FIGS. 4a, 4b.

Although the load carrier connecting device 56*b* can be used to advantage with a single-part holder part 12*b'*, the embodiment according to FIGS. 4 and 5 prefers the multi-component construction of a load carrier or a coupling arm as described for the first embodiment.

Like the holder part 12*a*, the holder part 12*b* is designed for a plug-in connection to the respective base holder, in this case the base holder 11*b*. The base holder 11*b* has a reception sleeve 19*b* of a structure similar to that of the reception sleeve 12*a*, having for example lateral anti-rotation positive-locking contours 28. Anti-rotation positive-locking contours 27 of a base holder fixing device 26*b* fit positively into the anti-rotation positive-locking contours 28. In contrast to the reception sleeve 19*a*, however, the reception sleeve 19*b* is not mounted on the crossmember 17 with a substantially horizontal orientation, but is oriented vertically. The holder part 12*b* is therefore inserted into the plug-in receptacle 20 of the base holder 11*b* from below (insertion axis 93).

The base holder fixing device 26*b* and the base holder fixing device 26*c* are based on the same concept as the base holder fixing device 26*a*, and we refer to the above description in this respect.

In the interior of a plug-in projection 22*b* of the holder parts 12*b*, 12*b'* and 12*c*, for example, an operating body 32 is provided which can displace positive-locking bodies, for example balls, through guide channels 34*a* radially outwards beyond the outer circumference of the plug-in projection 22*b*, where they can enter corresponding positive-locking receptacles in the reception sleeve 19*b*, such as an annular groove or at least one calotte in particular. The holder parts 12*b*, 12*b'* and 12*c* are provided with operating means to operate the operating body 32, for example with a diagrammatically indicated handle which acts on a toothed section on the respective operating body 32 by way of a pinion not shown in the drawing.

Figure 7:
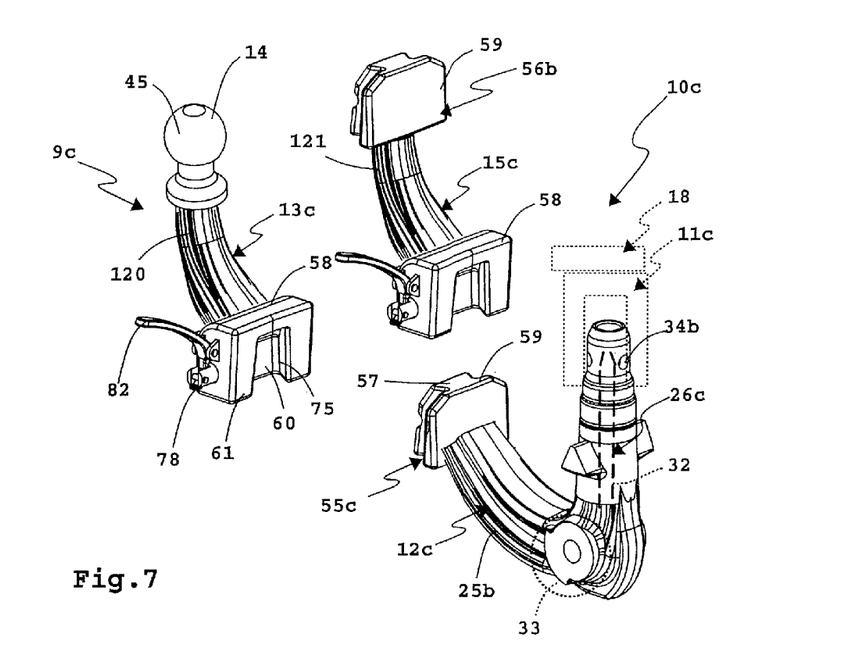
FIG. 7 shows a variant of the system according to FIGS. 4 and 5, wherein an arm connecting device and a load carrier connecting device have identically constructed, mutually compatible components.

While the holder part 12*b'* is a single-piece holder part, the systems 10*b* and 10*c* are based on a two-piece concept, wherein a coupling part 13*b* or 13*c* can optionally be secured to the holder part 12*b* or 12*c* by means of an arm connecting device 55*b* or 55*c*.

If the holder part 12*b'* were for example divided in the region of a line of intersection 94, a bayonet connection between the two parts would be expedient, so that the front section (corresponding to a coupling part or a load carrier adapter part) could be releasably secured within the meaning of the invention to the rear section, i.e. the holder part 12*b'*, in a rotary movement.

For additional security, an additional locking device, for example a bolt, a cross-pin or the like, can be provided.

The arm connecting device 55*b* comprises a mounting flange 41*b* located at a front free end 96 of the holder part 12*b*.

The mounting flange 41*b* projects laterally beyond the outer circumference of the free end 96, providing a large-area support for a mounting flange 43*b* on the coupling part 13*b* or the load carrier adapter part 15*b*. If the two mounting flanges 41*b*, 43*b* are in contact with one another, they can be bolted to one another by means of bolts not shown in the drawing but resembling the bolts 47, which pass through bores 48 in the mounting flanges 41*b*, 43*b*.

Considerably more comfortable is the connection concept in the arm connecting device 55*c*, which is in principle identical to the load carrier connecting device 56*b* in its structure. At the free end of the holder part 12*c*, a plug-in head 59 is provided as a first connecting body 57, to which a receiving body 61 can be fitted as a second connecting body 58 which is located on the coupling part 13*c* and the load carrier adapter part 15*c*.

The arm connecting device 55*c* therefore comprises a quick-release coupling, so that the coupling part 13*b* can be replaced quickly by the load carrier adapter part 15*b* and vice versa.

The concept of the load carrier connecting device 55*b* is incorporated twice in the system 10*c*, being provided at the front of the load carrier adapter part 15*c* as well. It would therefore in principle be possible to secure the load carrier 16*b* directly to the arm connecting device 56*c*. This allows for great constructional flexibility, so that the load carrier 16*b* can for example be secured to the vehicle 18 at a greater distance from the road surface by means of the load carrier adapter part 15*c*, or optionally at a lesser distance from the road surface by securing the load carrier 16*b* directly to the holder part 13*c*.

Figure 8:
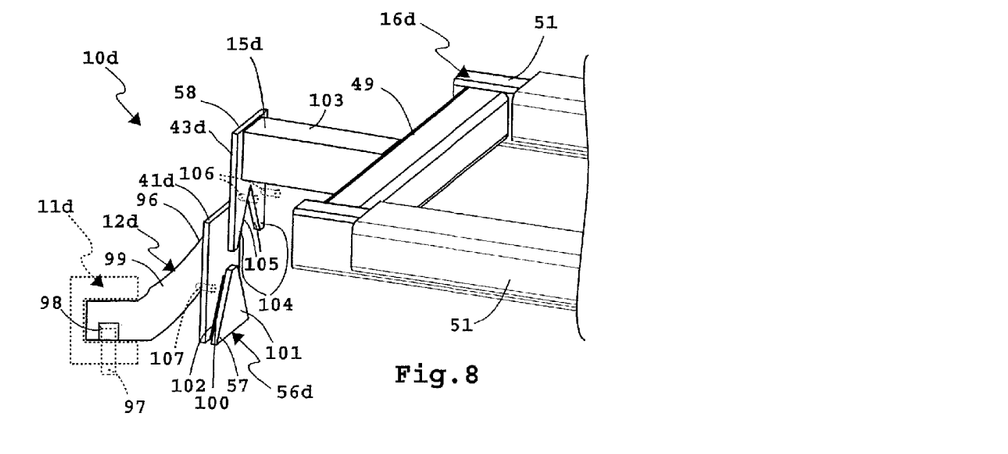
FIG. 8 shows a holder part or a load carrier adapter part with a further possible variant of an easily released connecting device.

In the load carrier system 10*d*, of which parts are only shown diagrammatically, the load carrier connecting device 55*d* is represented by a quick-release coupling between the load carrier 16*d* and the holder part 12*d* in the form of a dovetail joint. The holder part 12*d* can for example be plugged into the base holder 11*d*. A locking facility is provided by a base holder fixing device 26*d*, which may for example comprise a latch 97, in particular a latch operated manually or by an electric motor, which is movable on the base holder 11*d* designed as a sleeve. In its locking position, the latch 97 engages with a receptacle 98 on a plug-in projection of the holder part 11*d*.

At a free end 96 of an arm section 99 of the holder part 12*d*, a mounting flange 41*d* is provided. The mounting flange 41*d* is plate-shaped and has on its free side remote from the free end 96 a plug-in receptacle 100. The plug-in receptacle 100 is formed between the mounting flange 41*d* and a plate 101. The plate 101 is triangular. The plug-in receptacle 100 is likewise triangular. The plug-in receptacle 100 comprises grooves 102 inclined relative to one another, which are formed between the mounting flange 41*d* and the plate 101.

At a free end of a holding arm 103 projecting beyond the crossmember 49 of the load carrier 16*d*, a mounting flange 43*d* or a mounting plate is provided which has plug-in projections 104 on its underside. The plug-in projections 104 have angular facing inner side surfaces 105 lying in the bottoms of the grooves 102. If the plug-in projections 104 are inserted into the grooves 102, the system is therefore secured against rotation about a longitudinal vehicle axis. A further anti-rotation facility—about a transverse vehicle axis—is provided by the expedient surface contact between the front free side of the mounting flange 43*d* and the mounting flange 41*d* as well as by the support, in particular of the plate 101, in the grooves 102. This plug-in connection can obviously be established very easily, accompanied by some degree of self-centering. As the two groove bottoms of the grooves 102 point upwards, the load carrier connecting device 56*d* is automatically centered with respect to the longitudinal vehicle axis when the plug-in projections 104 are inserted into the grooves 102.

Additional security is provided if for example latches 106 provided on a connecting body, for example the connecting body 58, can be inserted into latching receptacles 107 on the other connecting body 57 when the two connecting bodies 57, 58 adopt their connecting position, i.e. the plug-in projections 104 are inserted into the plug-in receptacle 100.

A latching arrangement would obviously be possible as well, for example if the latches 106 are designed as or replaced by latching bodies which are spring-loaded towards the locking or latching position.

Figure 9:
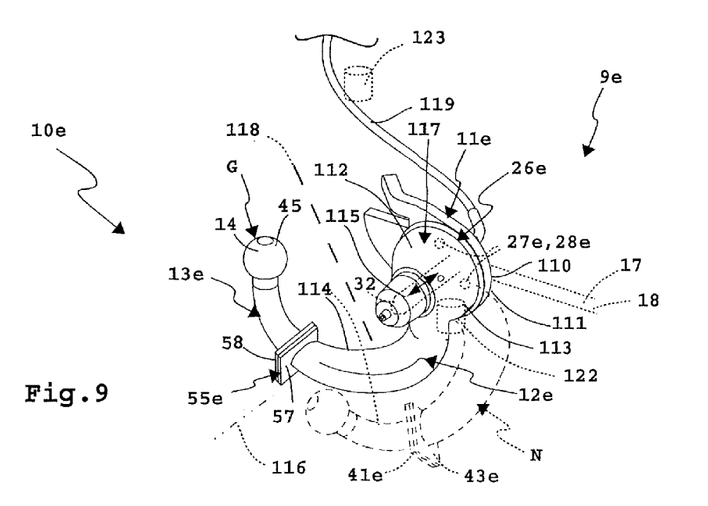
FIG. 9 shows a pivotable trailer coupling with an interchangeable coupling part.

In the above embodiments, the holder part can be removed from the base holder if not used. In the system 10e, on the other hand, these components are permanently connected to one another but movable relative to one another. The base holder 11e for example comprises a plate 110 which can be secured to a vehicle crossmember 17 of a vehicle 18. The plate 110 forms a part of a bearing component 111 on which a bearing body 113 of the holder part 12e, which represents a second bearing component 112, is mounted for pivoting about a pivoting axis 116. For example, a bearing pin not visible in the drawing projects from the plate 110; this penetrates into the bearing body 113, and on this the bearing body 113 is rotatably—expediently also slidably-mounted. The bearing components 111, 112 therefore form a pivot/sliding bearing 117.

By means of the pivot/sliding bearing 117, the holder part 12e with the coupling part 13e or with the load carrier adapter part not shown in the drawing can be moved between a position of use G, in which it projects towards the rear beyond the rear bumper 118 for towing a trailer or for holding a load carrier, and a position of non-use N (indicated by broken lines), in which it is at least partially moved behind the rear bumper 121.

Using the sliding facility indicated by an arrow 115, an operating body 32 of the base holder fixing device 26e, which preferably acts on positive-locking bodies such as balls located in the interior of the holder part 12e, can displace the bearing body 113 towards the plate 110, so that balls and calottes provided as anti-rotation positive-locking contours 27d and 28d on the plate 110 and the facing side of the bearing body 113 come into engagement with one another and thereby non-rotatably locate the bearing body 113 relative to the plate 110 and the base holder 11e.

The operating body 32 can preferably be operated by means of a pulling and/or pushing element 119, for example a control cable.

The operating body 32 is preferably spring-loaded towards it locking position.

An arm 114 projects from the bearing body 113. The free end 96 of the arm 114 is fitted with an arm connecting device 55e which comprises a mounting flange 41e which forms a first connecting body 57.

A mounting plate 43e serving as a second connecting body 58 located on the coupling part 13e can be attached to this first connecting body 57, preferably by bolting. The arm connecting device 55e is therefore similar to the arm connecting device 55a or 55b.

This concept alone already allows a load carrier adapter part not shown in the drawing to be secured to the base system comprising the base holder 11e and the holder part 12e instead of the coupling part 13e. In place of a simple flange system, other comfortable connecting technologies can obviously be used, for example the quick-release coupling of the load carrier connecting device 56b or the arm connecting device 55d, a bayonet lock or the like.

A quick-release coupling of the type of the connecting devices 55c, 56c or a diagrammatically indicated bayonet connection as in the system 10b' could obviously be used in the load carrier system 10a or 10e as well, for example as a replacement for the arm connecting device 55a, 55e and/or for adapting or securing a load carrier.

The above explanations show that a small number of base systems comprising a base holder and a holder part can be individually adapted to the respective conditions on site, for example to the structural design of the vehicle, simply by adapting a coupling part or a load carrier adapter part.

The system 10a is provided for a horizontal mounting of a coupling arm or a load carrier, while a vertical mounting arrangement in which the reception sleeve 19b in particular can be concealed behind a rear bumper is implemented in the system 10b.

The plug-in connection 22b accordingly points upwards, extending substantially in a straight line.

The plug-in projection 22b projects at an angle from a neck region 25b of the holder part 12b. The neck region 25b has a curvature towards its free end 96, in the assembled state upwards towards the free end 96.

Arm sections 120, 121 of the coupling part 13b and the load carrier adapter part 15b likewise have a curvature, so that the coupling element 14 and the plug-in head 59 project relatively far towards the rear and the top beyond the rear end of the vehicle 18. The rear bumper in a manner of speaking fits into a gap between the plug-in projection 22b on the one hand and the coupling element 14 or the plug-in head 59 on the other hand.

In the system 10e, it becomes clear that the relatively complex pivot and/or slide mounting and its location for travelling (by means of the base holder fixing device 26e) can be used in several ways, i.e. for towing a trailer on the one hand (by means of the coupling part 13e), but also for a simple, fast and safe adaptation of a load carrier. The load carrier adapter part 15b could for example be secured to the holder part 12e.

Simple connection technologies, for example involving mounting flanges (arm connecting device 55a, 55e), can be used, but also quick-release couplings as made clear in the case of the arm connecting device 55c or the load carrier connecting device 55b.

For pivoting and/or axially displacing the holder part 12e about or along the pivoting axis 116, a drive 122 can expediently be provided, for example an electric motor.

For operating the operating body 92, i.e. the fixing device 26e, a motor drive, for example a drive 123, can advantageously be provided. The drive 123 can also act on the pulling and/or pushing element 119, for example.

The locking element 78 can likewise be operated by a motor not shown in the drawing, for example an electric motor.

The invention claimed is:

1. A trailer coupling for a motor vehicle, in particular a passenger car, comprising a base holder which can be or is securely mounted on the vehicle and further comprising a coupling arm at the free end of which a coupling element is arranged for coupling a trailer and which protrudes from the rear from the motor vehicle in a position of use, wherein the coupling arm can be releasably secured to the base holder or is mounted movably between the position of use and a position of non-use in which it is moved towards the motor vehicle, wherein, for connection to the base holder, the coupling arm comprises a holder part which can be secured to the base holder by means of a base holder fixing device and a coupling part on which the coupling element is located, wherein the holder part and the coupling part can be releasably connected to one another by means of a connecting device serving as an arm connecting device, which comprises a first connecting body and a second connecting body which can be releasably connected to the first connecting body, and wherein the first connecting body comprises a plate-shaped mounting flange provided on a mounting section of the holder part, and the second connecting body comprises a plate-shaped mounting plate provided on the coupling part, the plate-shaped mounting flange of the holder part facing the plate-shaped mounting plate of the coupling part and being releasably connected thereto by at least one of a clamping mechanism, screws or bolts.

2. A trailer coupling according to claim 1, further comprising a load carrier adapter part which, for connection to the holder part, comprises a connecting body matching the connecting body of the holder part and which is or can be connected to a load carrier having a carrying area for carrying a load, or wherein such a load carrier can be connected to the connecting body of the holder part.

3. A trailer coupling according to claim 2, wherein the load carrier adapter part and the load carrier comprise a load carrier connecting device for a releasable connection to one another.

4. A trailer coupling according to claim 3, wherein the load carrier connecting device and the arm connecting device have an identical structure and/or mutually compatible components.

5. A trailer coupling according to claim 1, wherein the arm connecting device can be released and/or closed without the use of tools and/or comprise(s) a lock.

6. A trailer coupling according to claim 3, wherein the first connecting body and/or the second connecting body has/have a mounting flange.

7. A trailer coupling according to claim 1, wherein the first connecting body and the second connecting body have at least one positive-locking projection and at least one positive-locking receptacle, for a positive hold of the connecting bodies on one another.

8. A trailer coupling according to claim 7, wherein the at least one positive-locking projection comprises a dovetail projection and the at least one positive-locking receptacle comprises a dovetail receptacle.

9. A trailer coupling according to claim 1, wherein the first connecting body and the second connecting body comprise bayonet connecting means.

10. A trailer coupling according to claim 1, wherein the connecting device comprises a locking element for locking the connection between the first connecting body and the second connecting body, wherein the locking element is captively mounted on the first connecting body or the second connecting body for movement between a locking position and an unlocking position and in the locking position engages with a locking receptacle on the other connecting body.

11. A trailer coupling according to claim 10, wherein the locking element is spring-loaded towards the locking position, and/or wherein the coupling comprises a drive motor for operating the locking element.

12. A trailer coupling according to claim 3, wherein the connecting device comprises a clamping element or a clamping body by means of which the first connecting body can be clamped to the second connecting body.

13. A trailer coupling according to claim 1, wherein the base holder fixing device has at least one pair of positive-locking surfaces of which at least one can be moved between a release position, in which the positive-locking surfaces are at a distance from one another, and a fixing position of the fixing device, in which the positive-locking surfaces are in positive contact with one another.

14. A trailer coupling according to claim 13, wherein the at least one movable positive-locking surface is provided on or in a positive-locking body movably mounted on the holder part and/or wherein the coupling comprises a drive motor for operating the at least one movable positive-locking surface.

15. A trailer coupling according to claim 1, wherein the base holder fixing device comprises stationary anti-rotation positive-locking contours on the holder part and on the base holder, which anti-rotation positive-locking contours positively engage with one another at least in the position of use for a non-rotatable hold of the holder part on the base holder.

16. A trailer coupling according to claim 1, wherein the base holder fixing device comprises a movably mounted operating body or displacer body for operating or displacing at least one positive-locking body into a positive-locking receptacle, each of which is provided with a positive-locking surface.

17. A trailer coupling according to claim 1, wherein the base holder fixing device comprises at least one positive-locking body movably mounted in or on the holder part for engagement with a positive-locking receptacle on the base holder and/or at least one operating body or displacer body, in particular a bolt, movably mounted in or on the holder part for operating or displacing at least one positive-locking body, which is advantageously movably mounted in or on the holder part into a positive-locking receptacle.

18. A trailer coupling according to claim 1, wherein the base holder comprises a plug-in receptacle into which a plug-in projection of the holder part can be inserted, or wherein the base holder and the holder part comprise bearing components of a pivot bearing and/or a sliding bearing, so that the holder part is pivotably and/or slidably mounted on the base holder.

19. A trailer coupling according to claim 1, further comprising a motor drive for moving the holder part between the position of use and the position of non-use in which it is moved towards the vehicle.

20. A trailer coupling for a motor vehicle comprising:
a base holder securely mountable on the vehicle, the base holder including a stationary anti-rotation positive-locking contour formed on an insertion opening thereof, the contour having a triangular-shape or wedge-shape;
a holder part releasably connected to the base holder, the holder part including a plug-in projection for insertion into the insertion opening of the base holder and a neck region, the neck region having a stationary anti-rotation positive-locking contour extending laterally from the neck region, the contour having a triangular-shape or wedge-shape engaged with the stationary anti-rotation positive-locking contour formed on the insertion opening of the base holder to prevent rotation of the holder part with respect to the base holder; and
a coupling part releasably connected to the holder part opposite the base holder, the coupling part including a coupling element at a free end thereof for coupling a trailer.

21. A trailer coupling for a motor vehicle comprising:
a base holder securely mountable on the vehicle, the base holder having a plug-in receptacle and a positive-locking receptacle formed in the plug-in receptacle;
a holder part releasably connected to the base holder, the holder part having a plug-in projection inserted into the plug-in receptacle of the holder part, the holder part further including a base holder fixing device for manually releasably securing the holder part to the base holder, the base holder fixing device including a bolt-shaped operating body axially movable within the plug-in projection, at least one positive-locking body radially extendable outwardly from the plug-in projection, and a rotatable handle for driving the operating body between a locked position in which the operating body causes the positive-locking body to extend radially outwardly from the plug-in projection for engagement with the positive-locking receptacle of the base holder plug-in receptacle and a release position in which the operating body allows the positive-locking body to retract radially inwardly into the plug-in projection to release engagement with the positive-locking receptacle of the base holder plug-in receptacle; and a coupling part releasably connected to the holder part opposite the base holder, the coupling part including a coupling element at a free end thereof for coupling a trailer.

\* \* \* \* \*